(12) United States Patent
Caldwell

(10) Patent No.: US 10,814,560 B2
(45) Date of Patent: Oct. 27, 2020

(54) WAVEGUIDE FOR NARROW SIMULTANEOUS LASER PLASTICS WELDING

(71) Applicant: Branson Ultrasonics Corporation, Danbury, CT (US)

(72) Inventor: Scott Caldwell, New Milford, CT (US)

(73) Assignee: Branson Ultrasonics Corporation, Danbury, CT (US)

( * ) Notice: Subject to any disclaimer, the term of this patent is extended or adjusted under 35 U.S.C. 154(b) by 96 days.

(21) Appl. No.: 16/251,295

(22) Filed: Jan. 18, 2019

(65) Prior Publication Data

US 2019/0224921 A1    Jul. 25, 2019

Related U.S. Application Data

(60) Provisional application No. 62/620,168, filed on Jan. 22, 2018.

(51) Int. Cl.
*B29C 65/16* (2006.01)
*B29C 65/00* (2006.01)
(Continued)

(52) U.S. Cl.
CPC ........ *B29C 65/1687* (2013.01); *B23K 26/064* (2015.10); *B23K 26/073* (2013.01); *B23K 26/22* (2013.01); *B29C 65/1612* (2013.01); *B29C 65/1635* (2013.01); *B29C 65/1667* (2013.01); *B29C 66/1122* (2013.01); *B29C 66/41* (2013.01); *B29C 66/472* (2013.01); *B29C 66/81268* (2013.01); *B29C 65/167* (2013.01); *B29C 65/1696* (2013.01)

(58) Field of Classification Search
CPC . B29C 65/16; B29C 65/1687; B29C 65/1612; B29C 65/1635; B29C 65/1667; B29C 66/1122; B29C 66/41; B29C 66/472; B23K 26/064; B23K 26/073; B23K 26/22
See application file for complete search history.

(56) References Cited

U.S. PATENT DOCUMENTS 6,329,629 B1   12/2001  Grewell
6,528,755 B2    3/2003  Grewell et al.
(Continued)

FOREIGN PATENT DOCUMENTS

EP         2957418 A1    12/2015
WO    WO-2016063720 A1    4/2016

OTHER PUBLICATIONS

International Search Report and Written Opinion regarding PCT/US2019/014303, dated Apr. 11, 2019.

*Primary Examiner* — Daniel McNally
(74) *Attorney, Agent, or Firm* — Harness, Dickey & Pierce, P.L.C.

(57) ABSTRACT

A narrow waveguide homogenizes laser light traveling from a laser light source of a laser bank through a plurality of laser delivery bundles that include at least a fiber optic bundle leg to weld a plurality of work pieces along a weld line that is narrower than the width of the fiber optic bundle leg. The narrow waveguide has a portion associated with each fiber optic bundle leg that is narrower than the fiber optic bundle leg with which that portion of the waveguide is associated. A reflective bounce plane diverts laser light of the fiber optic bundle leg that does not travel through the narrow waveguide.

14 Claims, 4 Drawing Sheets

(51) Int. Cl.
*B23K 26/064* (2014.01)
*B23K 26/073* (2006.01)
*B23K 26/22* (2006.01)

(56) References Cited

U.S. PATENT DOCUMENTS

| | | |
|---|---|---|
| 6,713,713 B1 | 3/2004 | Caldwell et al. |
| 7,085,296 B2 | 8/2006 | Caldwell |
| 7,343,218 B2 | 3/2008 | Caldwell et al. |
| 7,723,640 B2 | 5/2010 | Caldwell et al. |
| 2005/0121424 A1* | 6/2005 | Caldwell ............. B29C 65/1667 219/121.63 |
| 2006/0219675 A1 | 10/2006 | Caldwell et al. |
| 2011/0108529 A1* | 5/2011 | Wollmann ............ B23K 26/037 219/121.63 |
| 2013/0312903 A1* | 11/2013 | Yu .......................... G02F 1/1339 156/275.5 |

* cited by examiner

WAVEGUIDE FOR NARROW SIMULTANEOUS LASER PLASTICS WELDING

CROSS-REFERENCE TO RELATED APPLICATIONS

This application claims the benefit of U.S. Provisional Application No. 62/620,168 filed on Jan. 22, 2018. The entire disclosure of the above application is incorporated herein by reference.

FIELD

The present disclosure relates to plastics welding and, more particularly, relates to providing narrow weld widths along a weld line in plastics welding applications.

BACKGROUND

This section provides background information related to the present disclosure which is not necessarily prior art.

Laser welding is commonly used to join plastic or resinous parts, such as thermoplastic parts, at a welding zone.

As is well known, lasers provide a semi-focused beam of electromagnetic radiation at a specified frequency (i.e., coherent monochromatic radiation). There are a number of types of radiant sources available. One example of laser welding is Through Transmission Infrared (TTIr) welding, which is a favored technology for welding plastic or resinous parts. TTIr welding employs infrared light passed through a first plastic part and into a second plastic part. In many aspects, the tooling of TTIr assemblies includes fiber optic bundles and waveguides for directing infrared light from a light source to the plastic parts to be welded. Under many TTIr welding methods and other laser welding methods, the use of waveguides is prevalent. As is known, waveguides homogenize the infrared light. The width of the weld depends on, inter alia, the diameter of the end of the fiber optic bundles, along with the interior characteristics of the waveguide (such as the angular slope of the waveguide), the angular spread of the laser light from the optic fibers, and the thickness of the transmissive part to be welded.

One type of TTIr is simultaneous through transmissive infrared welding, referred to herein as STTIr. In STTIr, the full weld path or area (referred to herein as the weld path) is simultaneously exposed to laser radiation, such as through a coordinated alignment of a plurality of laser light sources, such as laser diodes. An example of STTIr is described in U.S. Pat. Ser. 6,528,755 for "Laser Light Guide for Laser Welding," the entire disclosure of which is incorporated herein by reference. In STTIr, the laser radiation is typically transmitted from one or more laser light sources to the parts being welded through one or more optical waveguides which conform to the contours of the parts' surfaces being joined along the weld path.

FIG. 1 shows an example of a prior art STTIr laser welding system 100. STTIr laser welding system 100 includes a laser support unit 102 including one or more controllers 104, an interface 110, one or more power supplies 106, and one or more chillers 108. The STTIr laser welding system 100 may also include an actuator, one or more laser banks 112, and an upper tool/waveguide assembly 35 and a lower tool 20 fixtured on a support table. Each laser bank 112 includes one or more laser channels 113 with each laser channel 113 having a laser light source 122. Laser support unit 102 is coupled to the actuator and each laser bank 112 and provides power and cooling via power supply (or supplies) 106 and chiller (or chillers) 108 to laser bank(s) 112 and controls the actuator and laser bank(s) 112 via controller 104. The actuator is coupled to the upper tool/waveguide assembly 35 and moves it to and from the lower tool 20 under control of controller 104. In operation, laser bank 112 directs laser energy via a source of laser radiation through a plurality of laser delivery bundles 10. Each laser delivery bundle 10 may be further split into legs and each leg is comprised of at least a laser delivery optical fiber. If laser delivery bundle 10 is not split into legs, then each laser delivery bundle 10 is comprised of at least a laser delivery optical fiber. Each laser delivery optical fiber delivers laser energy from a source of laser radiation of laser bank 112 through a waveguide 30 to a plurality of work pieces 60 to be welded together. Waveguide 30 homogenizes the laser energy delivered to work pieces 60 through each laser delivery optical fiber.

In some laser welding applications, a waveguide may be shaped in a linear fashion to accept laser light distributed from a rowed series of fiber optic bundles. In some laser welding applications, it is desirable that the width of the waveguide is slim, e.g., to accommodate work pieces that are shaped in a way that would obstruct a wider waveguide, or to provide a narrower weld. There is a practical lower limit to the diameter of fiber optic bundles. Further, there is a practical minimum size of the waveguide; namely, the size of the waveguide should be sized to be greater than or equal to the width of the laser light path emitted by fiber optic bundle to prevent laser light emitted by the fiber optic bundles from spilling over the edges of the waveguide. Moreover, because the width of a weld is also dependent on the angular spread of the optical fibers, tapering the waveguide will not narrow the resultant width of the weld in all cases.

Rather, there is a practical lower limit to how narrowly the waveguide can be tapered before the angular spread of the laser light increases the effective width of the weld. According to the principle of etendue, the more the waveguide tapers, the more the outgoing angular spread of the laser light becomes. There is therefore a practical lower limit to the width of a weld (e.g., a weld spot, or the width of a length of a weld defined by the path where a plurality of work pieces is to be welded). As one example, reference to FIG. 2 is made. On the left, weld spot 202 is shown, where laser light travels through fiber optic bundle leg 204 through tapered waveguide 206 through transmissive plastic part to be welded 208 to absorptive part to be welded 210. On the right, weld spot 202' is shown, where laser light travels through fiber optic bundle leg 204' through more tapered waveguide 206' through transmissive plastic part to be welded 208' to absorptive part to be welded 210'. Notably, weld spot 202 and weld spot 202' are generally equal in size even with the use of more tapered waveguide 206' as shown on the right rather than with the use of tapered waveguide 206. This is because there is a practical lower limit to the width of a weld due to the nature of etendue. In other words, there is a practical lower limit to the width of a weld that may be achieved by tapering the waveguide. In certain applications, however, it is desirable to provide a weld having a weld width even narrower than what can be achieved using traditional fiber optic bundles and tapered waveguides.

SUMMARY

This section provides a general summary of the disclosure, and is not a comprehensive disclosure of its full scope or all of its features.

The present technology provides a method for welding a plurality of work pieces together along a weld path in a simultaneous laser welding system having a plurality of laser delivery bundles with each laser delivery bundle including at least one fiber optic bundle leg and a waveguide disposed between the fiber optic bundle legs and the plurality of the work pieces. The method includes directing laser light from at least one laser light source through each fiber optic bundle leg to a portion of the waveguide associated with that fiber optic bundle leg and providing each portion of the waveguide with a width that is narrower than a width of the fiber optic bundle leg with which that portion of the waveguide is associated. The method further includes providing a reflective bounce plane for each fiber optic bundle leg at an outlet of the fiber optic bundle leg and reflecting with the reflective bounce plane for each fiber optic bundle leg a first portion of the laser light from that fiber optic bundle leg and having a second portion of the laser light from that fiber optic bundle leg travel through the portion of the waveguide associated with that fiber optic bundle leg to the weld path to provide a weld where the second portion of the laser light impacts the weld path with a width that is narrower than the width of that fiber optic bundle leg.

In an aspect, the second portion of laser light from each fiber optic bundle leg that travels through its associated portion of the waveguide is homogenized.

In an aspect, positioning the fiber optic bundle legs and waveguide provides a continuous weld line.

In an aspect, positioning the fiber optic bundle legs and waveguide provides a linear weld line.

In an aspect, positioning the fiber optic bundle legs and waveguide provides a curvilinear weld line.

In an aspect, positioning the fiber optic bundle legs and waveguide provides a discontinuous weld line.

In an aspect, reflecting the first portion of laser light by each reflective bound plane includes reflecting the first portion of laser light away from the laser light source.

The present technology also provides a simultaneous laser welding system for welding a plurality of work pieces together along a weld path. The simultaneous laser welding system includes a laser bank having a light source, a plurality of laser delivery bundles wherein each laser delivery bundle includes at least a fiber optic bundle leg, and a waveguide disposed between the fiber optic bundle legs and the plurality of workpieces. The waveguide has a portion associated with each fiber optic bundle leg and each portion of the waveguide has a width that is narrower than a width of the fiber optic bundle leg with which that portion of the waveguide is associated. The fiber optic bundle legs extend between the laser bank and the waveguide and laser light from the laser light source of the laser bank is directed through the fiber optic bundle legs to the waveguide. A reflective bounce plane is associated with each fiber optic bundle leg and disposed at an outlet of that fiber optic bundle leg and is configured to reflect a first portion of laser light from the fiber optic bundle leg with which that reflective bounce plane is associated. Each portion of the waveguide is configured to provide a path through which laser light from the fiber optic bundle leg associated with that portion travels and to direct that laser light to the weld path wherein a width of a weld where the second portion of the laser light impacts the weld path is narrower than the width of that fiber optic bundle leg.

In an aspect, each portion of the waveguide homogenizes the laser light traveling through that portion.

In an aspect, the weld along the weld path is a continuous weld line.

In an aspect, the weld along the weld path is a linear weld line.

In an aspect, the weld along the weld path is a curvilinear weld line.

In an aspect, the weld along the weld path is a discontinuous weld line.

In an aspect, each reflective bounce plane reflects the laser light away from the laser light source.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
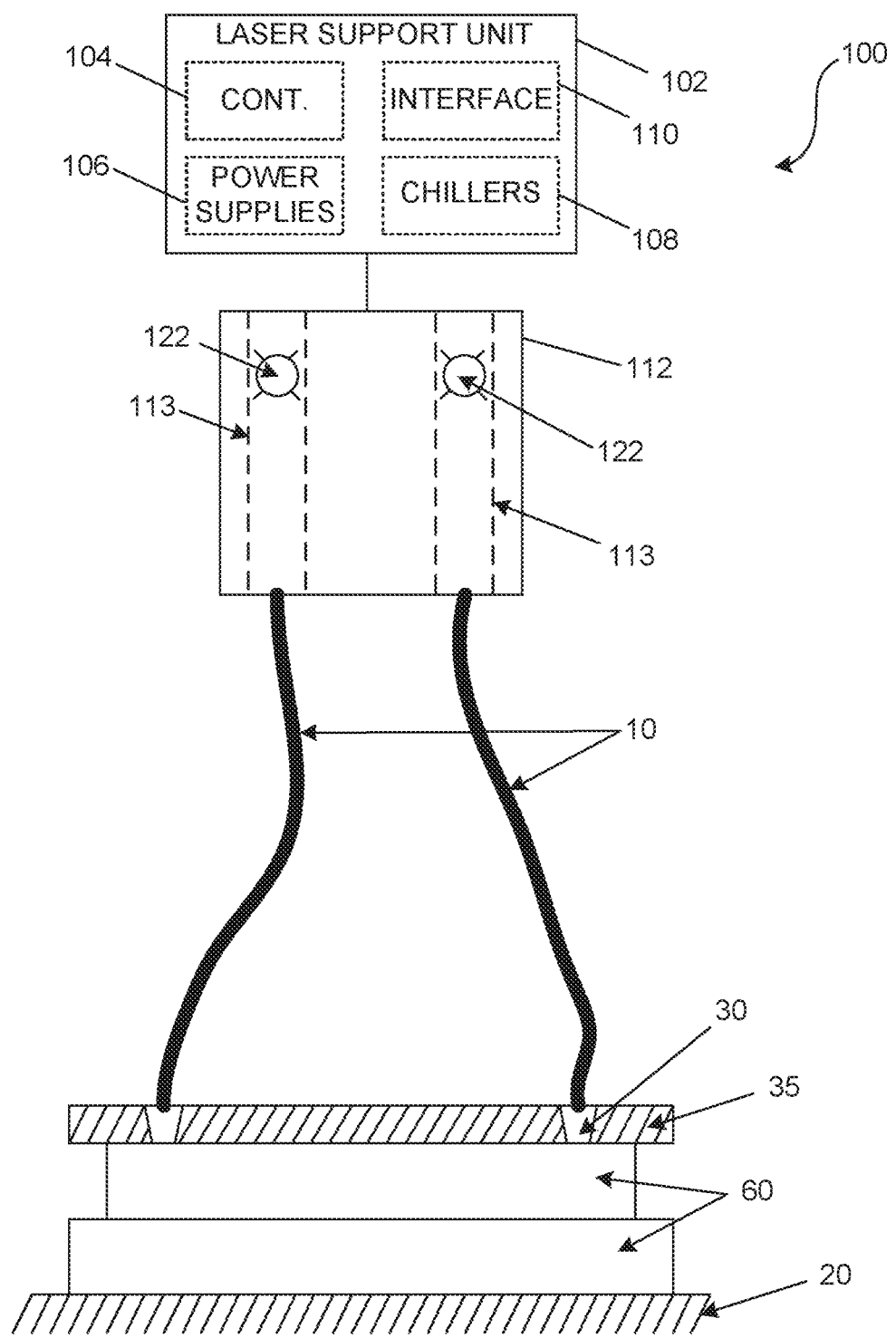
FIG. 1 is a schematic view illustrating a prior art laser welding system.
Figure 2:
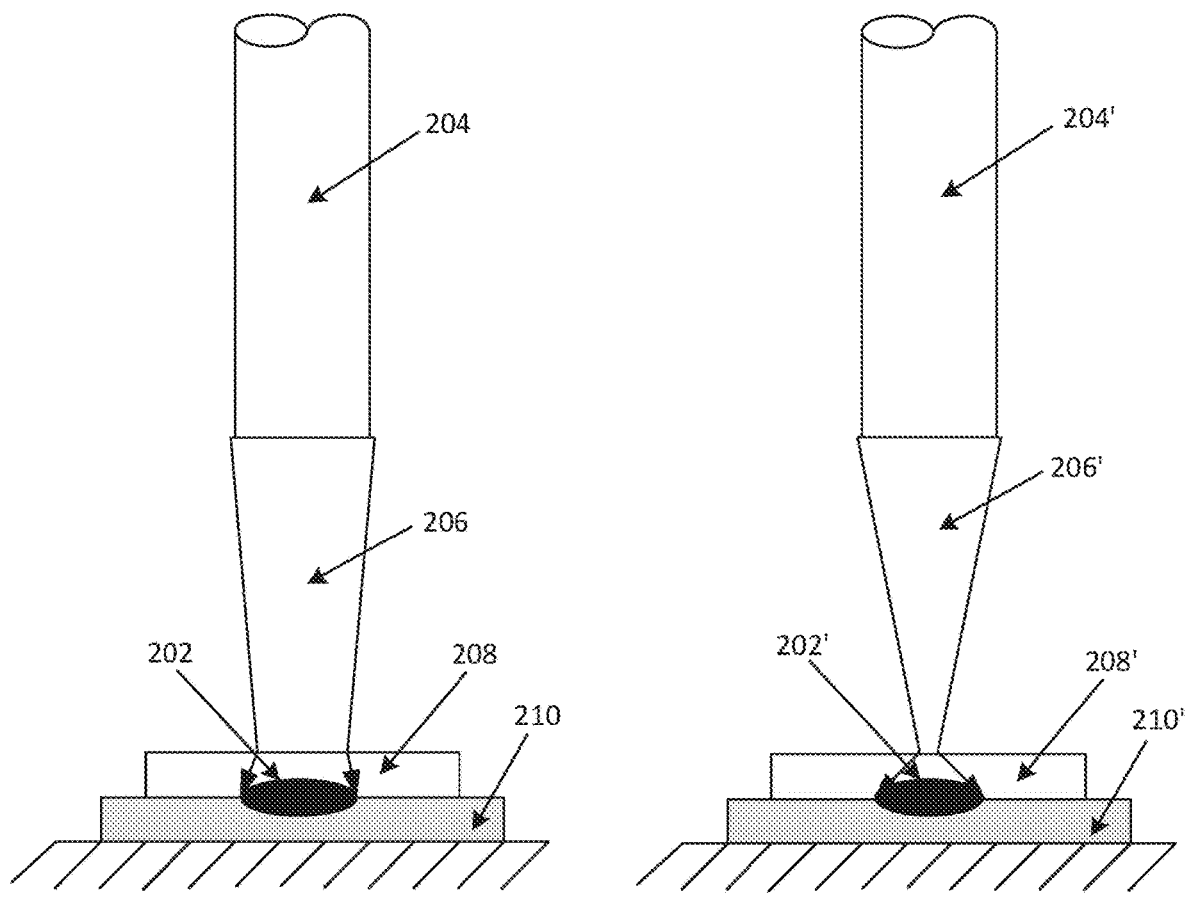
FIG. 2 is an enlarged schematic view illustrating the practical lower limit of the width of a weld that can be achieved by tapering the waveguide.

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

It should be understood for any recitation of a method, composition, device, or system that "comprises" certain steps, ingredients, or features, that in certain alternative variations, it is also contemplated that such a method, composition, device, or system may also "consist essentially of" the enumerated steps, ingredients, or features, so that any other steps, ingredients, or features that would materially alter the basic and novel characteristics of the invention are excluded therefrom.

The technology according to the present disclosure provides methods and apparatuses for use in simultaneous laser welding applications.

Under many aspects, the embodiments described according to the present disclosure may be used as part of an STTIr laser welding system, such as the STTIr laser welding system 100 described according to FIG. 1.

Figure 3:
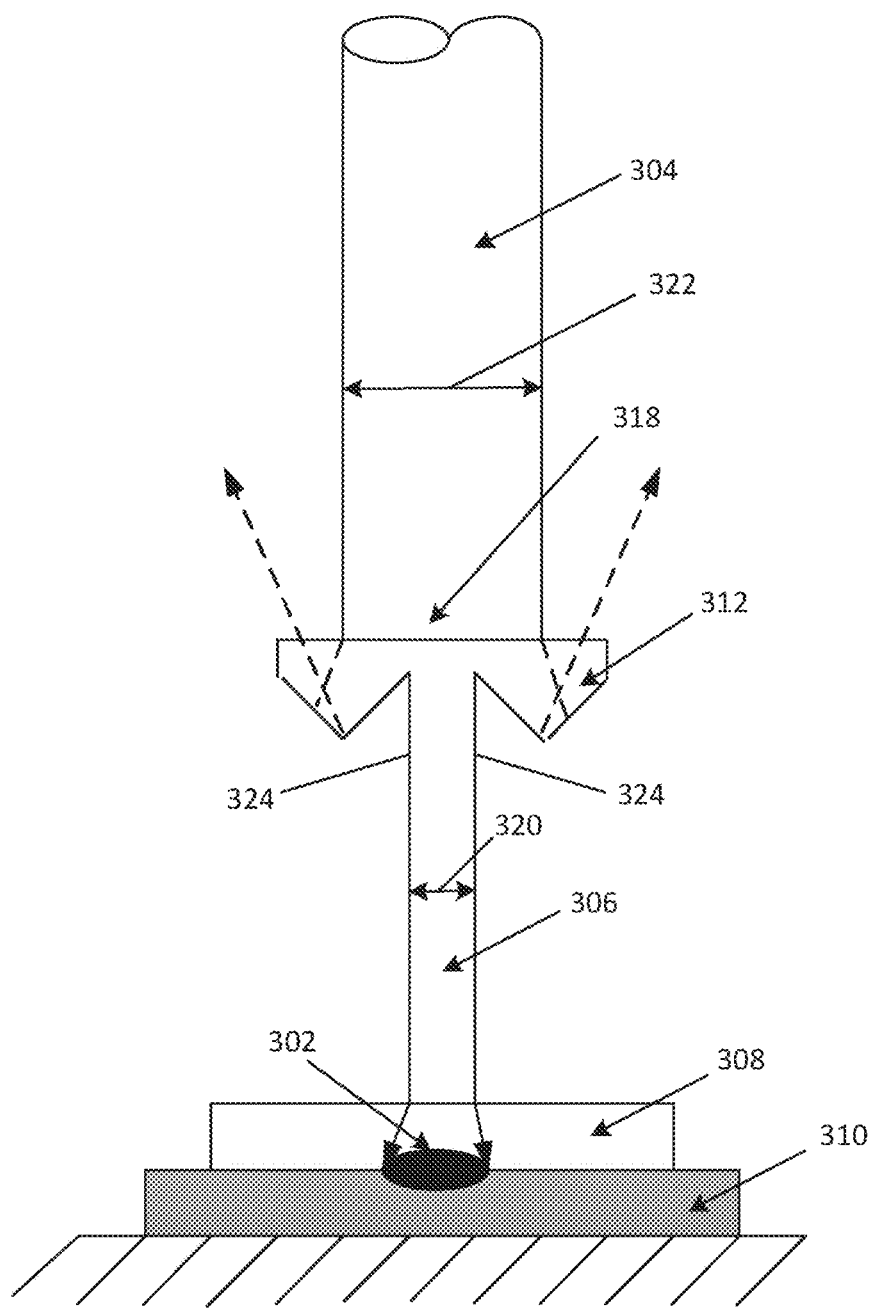
FIG. 3 is a schematic view illustrating the embodiments according to the present disclosure.

Turning now to FIG. 3, an embodiment according to the present disclosure is shown. In this embodiment, each fiber optic bundle leg 304 directs laser light from a laser light source (such as laser light source 122) through waveguide 306 through transmissive plastic part to be welded 308, where it is absorbed by absorptive plastic part to be welded 310 to form weld spot 302 at a point along the weld path where the plastic parts are welded together. It should be understood that a weld spot 302 is formed at each point along the weld path where laser light from an individual fiber optic bundle leg 304 impinges the weld path after traveling through the waveguide. The weld spots 302 collectively define a weld line 314 of the weld (shown in phantom in FIG. 4). As used herein, the term "width" or "weld width" when referring to a weld means a width of the weld along the weld line at any applicable point, that is, the width of the weld across the weld line at any applicable point.

As used herein, the term "fiber optic bundle leg" means a plurality of laser delivery optical fibers and can include a leg (such as a leg of a laser delivery bundle) comprised of a plurality of laser delivery optical fibers and/or a laser delivery bundle comprised of a plurality of legs and/or comprised of a plurality of laser delivery optical fibers. It should be understood that in this context, there is a portion 316 (while it is noted that the portion may appear as a circle, ellipsis, or other shape, depending on the shape of the waveguide, portion 316 is illustrated diametrically in phantom in FIG. 4) of waveguide 306 associated with each fiber optical bundle leg 304 which is where laser light from that fiber optical bundle leg 304 travels through the waveguide 306. When the following discussion refers to waveguide 306 and associated laser delivery optical fiber 304, this refers to the portion 316 of waveguide 306 where the laser light from that laser delivery optical fiber 304 travels through the waveguide 306. It should also be understood that the portions 316 of waveguide 306 could alternatively be provided by individual waveguides.

Notably, each weld spot 302 has a width that is significantly smaller than a width of the fiber optic bundle leg 304 that provided the laser light that formed that weld spot 302. This significantly narrowed weld spot 302 is accomplished by the portion 316 of waveguide 306 having a width 320 that is significantly narrower than a width 322 of the associated fiber optic bundle leg 304, such as a diameter of fiber optic bundle leg 304 when fiber optic bundle leg 304 has a circular cross-section such as in the example of FIGS. 3 and 4. Since the fiber optic bundle leg 304 is wider than the associated portion 316 of waveguide 306, only a first portion of the laser light exiting the fiber optic bundle leg will enter the associated portion 316 of waveguide 306 and a remaining second portion will spill over outer edges of the associated portion 316 of waveguide 306 and not enter the associated portion 316. Reflective bounce planes 312 associated with each fiber optic bundle leg 304 reflect the first portion of laser light and the second portion of laser light travels through the associated portion 316 of waveguide 306 to a point on the weld path along which parts 308, 310 are welded together and forms weld spot 302. In an aspect, at least one reflective bounce plane is disposed at an outlet 318 of each fiber optic bundle leg 304. In an aspect, there are reflective bounce planes 312 disposed at opposite sides 324 of each portion 316 of waveguide 306 so that these reflective bounce planes 312 reflect laser light on opposite sides of the weld line 314. In an aspect, the reflective bounce planes 312 are part of waveguide 306. Opposite sides 324 are opposed to each other across width 320 of portion 316.

Reflective bounce planes 312 preferably comprise material that reflect rather than absorb laser light used in STTIr applications. Accordingly, reflective bounce planes include laser mirrors, polished metal surfaces and total internal reflection surfaces. Reflective bounce planes 312 redirect laser light away from parts 308, 312 to be welded to prevent unwanted welding of same and away from the laser light source 122 or fiber optic bundle leg 304 to avoid damaging the laser system. Typically, reflective bounce planes 312 are placed at the end (e.g., outlet 318) of each fiber optic bundle leg 304 and an inlet of each portion 316 of waveguide 306.

Suitable waveguides according to the present disclosure share two primary attributes. First, each portion 316 of waveguide 306 has a width that is narrower than a width of the associated fiber optic bundle leg 304. Second, each portion 316 of waveguide 306 must be long enough to homogenize the laser light travelling through portion 316 of waveguide 306, thereby allowing for a uniform weld. In an example, each portion 316 of waveguide 306 has a uniform width along its length.

Figure 4:
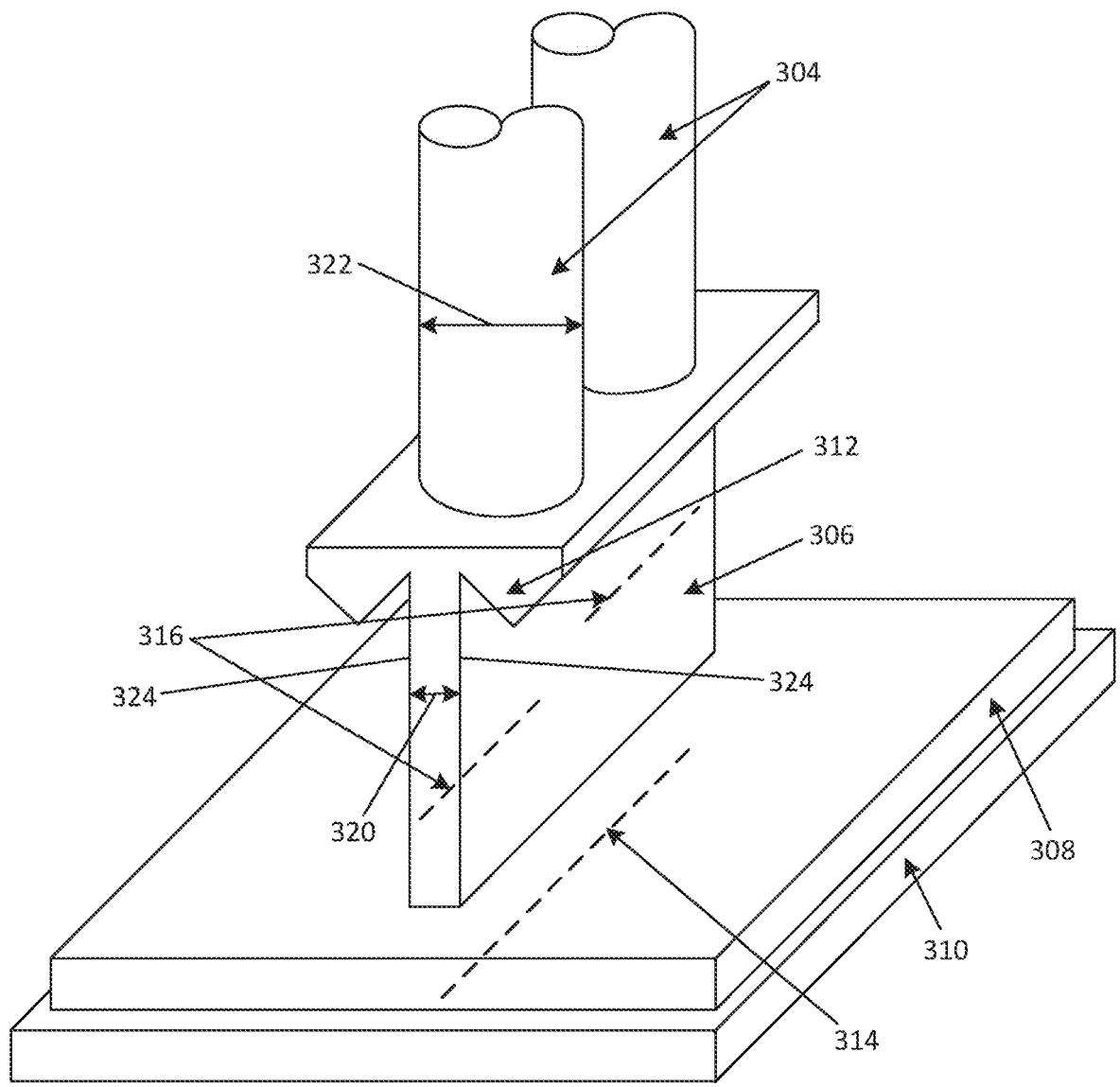
FIG. 4 is an enlarged isometric view illustrating the embodiments according to the present disclosure.

Referring to FIG. 4, an alternate view of the embodiment disclosed at FIG. 3 is shown. As should be appreciated, in STTIr applications multiple fiber optic bundle legs 304 simultaneously transmit laser light from a laser light source through associated portions 316 of waveguide 306 through to parts 308, 310 to be welded, which results in a weld area generally defined by an exit side of waveguide 306, wherein the exit side is defined by the side most nearly facing parts 308, 312 to be welded. Each portion 316 of waveguide 306 must extend sufficiently in a vertical direction to homogenize laser light passing through to parts 308, 310 to be welded.

Further, in STTIr applications, a waveguide can be fashioned to provide a weld length of any desirable or predetermined shape. Therefore, while waveguide 306 is shown in FIG. 4 as appearing straight along its length, it should be understood that waveguide 306 can be curvilinear. Similarly, while waveguide 306 is shown in FIG. 4 as appearing planar, it should be understood that waveguide 306 can have any orientation, three dimensionality, or other twists along a planar reference. It is further envisioned that waveguide 306 need not have a fixed width throughout the entire waveguide with one or more portions 316 of waveguide 306 having different widths than one or more of the other portions 316. It is therefore envisioned that the resulting weld line need not have a consistent width, and that the width at a given point along the weld line may be dependent on the width of the portion 316 of waveguide 306 adjacent that given point along the weld line, any resultant angular spread, and the width of fiber optic leg bundle 304 not redirected by reflective bounce plane 312 at that particular point. Further, the waveguide output shape can be fashioned as warranted by weld parameters or preferences, such as a triangle, dot, or blob.

The waveguide can be positive or negative or any combination of the two. A positive waveguide uses a solid medium that transmits the laser light and guides the light by total internal reflection. A negative waveguide transmits through a vacuum, gas, liquid or solid but relies on reflective walls to guide the laser light.

As noted above, the technology described above is suitable for use as a part of an STTIr laser welding system, such as the STTIr laser welding system 100 shown in FIG. 1. In such a modified STTIr system, it is contemplated that fiber optic bundle legs 304 would replace the legs of laser delivery bundle 10 and waveguide 306, along with the reflective bounce planes 312, would replace waveguide 30. Such a modified STTIr system would provide significantly narrower weld widths than possible with a conventional STTIr system using similarly sized fiber optic bundle legs. It is further contemplated that in such a system that laser light applied to the parts to be welded would form a weld length having a weld width significantly narrower than a weld width possible with a conventional STTIr system. And as discussed above, depending upon the parameters of waveguide 306, the resulting weld line could result in many forms, including being linear, curvilinear, continuous, discontinuous, having twists, and exhibiting a three-dimensional weld length. According to another aspect, such a weld line could be produced with a waveguide that is shaped to produce a desired shape, such as a triangle, dot, or blob. According to yet another aspect, the width of the weld line could vary along the path of the weld line, to the extent the width of the waveguide and/or corresponding reflective bounce planes change along the waveguide.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for welding a plurality of work pieces together along a weld path in a simultaneous laser welding system, the simultaneous laser welding system having a plurality of laser delivery bundles with each laser delivery bundle including at least one fiber optic bundle leg and a waveguide disposed between the fiber optic bundle legs and the plurality of the work pieces, the method comprising:
   directing laser light from at least one laser light source through each fiber optic bundle leg to a portion of the waveguide associated with that fiber optic bundle leg;
   providing each portion of the waveguide with a width that is narrower than a width of the fiber optic bundle leg with which that portion of the waveguide is associated; and
   providing a reflective bounce plane for each fiber optic bundle leg at an outlet of the fiber optic bundle leg and reflecting with the reflective bounce plane for each fiber optic bundle leg a first portion of the laser light from that fiber optic bundle leg and having a second portion of the laser light from that fiber optic bundle leg travel through the portion of the waveguide associated with that fiber optic bundle leg to the weld path to provide a weld where the second portion of the laser light impacts the weld path with a width that is narrower than the width of that fiber optic bundle leg.

2. The method of claim 1, wherein having the second portion of laser light from each fiber optic bundle leg travel through its associated portion of the waveguide includes homogenizing with the associated portion of the waveguide the laser light traveling through the waveguide.

3. The method of claim 1, including positioning the fiber optic bundle legs and waveguide to weld the plurality of work pieces together along the weld path with the weld being continuous along a weld line.

4. The method of claim 1, including positioning the fiber optic bundle legs and waveguide to weld the plurality of work pieces together along the weld path with the weld having a linear weld line.

5. The method of claim 1, including positioning the fiber optic bundle legs and waveguide to weld the plurality of work pieces together along the weld path with the weld having a curvilinear weld line.

6. The method of claim 1, including positioning the fiber optic bundle legs and waveguide to weld the plurality of work pieces together along the weld path with the weld being discontinuous along a weld line.

7. The method of claim 1, wherein reflecting the first portion of laser light by each reflective bounce plane includes reflecting the first portion of laser light away from the laser light source.

8. A simultaneous laser welding system for welding a plurality of work pieces together along a weld path, the simultaneous laser welding system comprising:
- a laser bank having a laser light source;
- a plurality of laser delivery bundles wherein each laser delivery bundle includes at least a fiber optic bundle leg;
- a waveguide having a portion associated with each fiber optic bundle leg wherein each portion of the waveguide has a width that is narrower than a width of the fiber optic bundle leg with which that portion of the waveguide is associated, the waveguide disposed between the plurality of work pieces and the fiber optic bundle legs;
- the fiber optic bundle legs extending between the laser bank and the waveguide with laser light from the laser light source of the laser bank directed through the fiber optic bundle legs to the waveguide;
- a reflective bounce plane associated with each fiber optic bundle leg and disposed at an outlet of that fiber optic bundle leg, each reflective bounce plane configured to reflect a first portion of laser light from the fiber optic bundle leg with which that reflective bounce plane is associated;
- each portion of the waveguide configured to provide a path through which laser light from the fiber optic bundle leg associated with that portion travels and to direct that laser light to the weld path wherein a width of a weld where the second portion of the laser light impacts the weld path is narrower than the width of that fiber optic bundle leg.

9. The simultaneous laser welding system of claim 8, wherein each portion of the waveguide homogenizes the laser light traveling through that portion.

10. The simultaneous laser welding system of claim 8, wherein the weld along the weld path is a continuous weld line.

11. The simultaneous laser welding system of claim 8, wherein the weld along the weld path is a linear weld line.

12. The simultaneous laser welding system of claim 8, wherein the weld along the weld path is a curvilinear weld line.

13. The simultaneous laser welding system of claim 8, wherein the weld along the weld path is discontinuous weld line.

14. The simultaneous laser welding system of claim 8, wherein each reflective bounce plane reflects the laser light away from the laser light source.

* * * * *